(12) United States Patent  (10) Patent No.: US 8,768,919 B2
Chellapilla et al.  (45) Date of Patent: *Jul. 1, 2014

(54) WEB SEARCHING (75) Inventors: Kumar Chellapilla, Redmond, WA (US); Anton Mityagin, Woodinville, WA (US); Xuanhui Wang, Urban, IL (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/599,543

(22) Filed: Aug. 30, 2012

(65) Prior Publication Data

US 2012/0323907 A1  Dec. 20, 2012

Related U.S. Application Data (63) Continuation of application No. 12/893,107, filed on Sep. 29, 2010, now Pat. No. 8,290,945, which is a continuation of application No. 12/056,302, filed on Mar. 27, 2008, now Pat. No. 7,836,058.

(51) Int. Cl.
    *G06F 7/00*   (2006.01)
    *G06F 17/30*  (2006.01)

(52) U.S. Cl.
    USPC ............................................. 707/727

(58) Field of Classification Search
    CPC ............................... G06F 17/30867
    USPC ............................................. 707/727
    See application file for complete search history.

(56) References Cited

U.S. PATENT DOCUMENTS

| 6,640,218 | B1 | 10/2003 | Golding |
| 7,542,970 | B2 | 6/2009 | Holmes |
| 7,603,348 | B2 | 10/2009 | He |
| 7,610,282 | B1 | 10/2009 | Datar |
| 7,836,058 | B2 | 11/2010 | Chellapilla et al. |
| 8,145,623 | B1 | 3/2012 | Mehta |
| 2005/0120311 | A1 | 6/2005 | Thrall |
| 2005/0149504 | A1 | 7/2005 | Ratnaparkhi |
| 2005/0154716 | A1 | 7/2005 | Watson et al. |
| 2005/0165753 | A1 | 7/2005 | Chen |
| 2006/0004891 | A1 | 1/2006 | Hurst-Hiller et al. |
| 2006/0253428 | A1 | 11/2006 | Katariya et al. |

(Continued)

OTHER PUBLICATIONS

Agichtein, et al., "Learning User Interaction Models for Predicting Web Search Result Preferences", In Proceedings of SIGIR'06, Aug. 6-11, 2006, Seattle, Washington, USA, pp. 3-10. http://research.microsoft.com/en-us/um/people/sdumais/sigir2006-fp338-preferences-agichtein.pdf., pp. 1-8.

(Continued)

*Primary Examiner* — Fred I Ehichioya
*Assistant Examiner* — Kris Mackes
(74) *Attorney, Agent, or Firm* — Steve Spellman; Jim Ross; Micky Minhas (57) ABSTRACT

A human or hand-labeled ranking of URL results for a search query is compared against actual click data for the respective query/URL pairs (e.g., which URLs were actually clicked on by users when the URLs were presented to users when the search query was run in the real world). The human ranking or ordering of the URL results (e.g., pre-existing relevance ranking) for the query can then be adjusted, if necessary, based upon the real world click data (e.g., click relevance ranking). The modified pre-existing relevance ranking can be used in providing future search results.

20 Claims, 11 Drawing Sheets

(56) References Cited

U.S. PATENT DOCUMENTS

| | | |
|---|---|---|
| 2006/0287993 A1 | 12/2006 | Yao et al. |
| 2007/0208730 A1 | 9/2007 | Agichtein et al. |
| 2007/0214115 A1 | 9/2007 | Liu et al. |
| 2007/0255689 A1 | 11/2007 | Sun et al. |
| 2011/0016116 A1 | 1/2011 | Chellapilla et al. |

OTHER PUBLICATIONS

Agichtein, et al., "Improving Web Search Ranking by Incorporating User Behavior Information", In Proceedings of SIGIR'06, Aug. 6-11, 2006, Seattle, Washintgton, USA, pp. 19-26. http://research.microsoft.com/en-us/um/people/sdumais/SIGIR2006-fp345-Ranking-agichtein.pdf., pp. 1-8.

Xue, et al., "Optimizing Web Search Using Web Click-through Data", In Proceedings of CIKM'04, Nov. 8-13, 2004. Washington D.C., USA, pp. 118-126. http://academic.research.microsoft.com/Paper/1237410.aspx., pp. 1-9.

Zimmerli, Christoph, "Using Clickthrough Data to Improve Web Search Rankings" Dec. 5, 2007, pp. 1-36.

Zhao, et al., "Adapting Document Ranking to Users' Preferences using Click-through Data", In Proceedings of CIKM'04, Nov. 8-13, 2004, Washington D.C., USA, pp. 1-10. http://research.microsoft.com/en-us/people/hangli/zhao-etal-airs2006.pdf., pp. 1-17.

Cheng, et al., "Scalable Relevance Feedback Using Click-Through Data for Web Image Retrieval", MM'06, Oct. 23-27, 2006, Santa Barbara, CA, USA, pp. 173-176., http://citeseerx.ist.psu.edu/viewdoc/summary?doi=10.1.1.93.5058., pp. 1-4.

Radlinski, et al., "Active Exploration for Learning Rankings from Clickthrough Data", In Proceedings of KDD'07, Aug. 12-15, 2007, San Jose, CA, USA, pp. 570-579., http://radlinski.org/papers/Radlinski07ActiveRanking.pdf., pp. 1-10.

Joachims, Thorsten., "Optimizing Search Engines using Clickthrough Data", SIGKDD 02 Edmonton, Alberta, Canada, pp. 133-142., http://www.cs.cornell.edu/People/tj/publications/joachims_02c.pdf., pp. 1-10, 2002.

Notice of Allowance cited in Related U.S. Appl. No. 12/056,302, Dated: Jul. 6, 2010, pp. 1-25.

Notice of Allowance cited in Related U.S. Appl. No. 12/893,107, Dated: Jun. 11, 2012, pp. 1-45.

| RANK/302 | IMPRESSION/304 | # CLICKS/306 |
|---|---|---|
| 2 | 1 | 1 |
| 8 | 5 | 1 |
| 9 | 1 | 0 |

| RANK/302 | IMPRESSION/304 | # CLICKS/306 | CLICK RATE AT RANK/402 | CLICK WEIGHT AT RANK/404 |
|---|---|---|---|---|
| 2 | 1 | 1 | 1.0 | 0.98 |
| 8 | 5 | 1 | 0.2 | 1.80 |
| 9 | 1 | 0 | 0.0 | 1.84 |

WEB SEARCHING

RELATED APPLICATION

This application is a continuation of U.S. patent application Ser. No. 12/893,107, filed on Sep. 29, 2010, entitled "WEB SEARCHING," and U.S. patent application Ser. No. 12/056,302, filed on Mar. 27, 2008, entitled "WEB SEARCHING," at least some of which may be incorporated herein.

BACKGROUND

The internet has vast amounts of information distributed over a multitude of computers, thereby providing users with large amounts of information on varying topics. This is also true for a number of other communication networks, such as intranets and extranets. Finding information from such large amounts of data can be difficult.

Search engines have been developed to address the problem of finding information on a network. Users can enter one or more search terms into a search engine. The search engine will return a list of network locations (e.g., uniform resource locators (URLs)) that the search engine has determined contain relevant information. Often search engines rely upon human judges to decide on the relevancy of search results. This generally involves a group of relevancy experts employed or otherwise engaged by a search engine entity to hand label a number of query/URL pairs. These labels are used for training ranking algorithms, relevance evaluation, and a variety of other search engine tasks.

Human labeling is an expensive and labor intensive task. Therefore, financial and logistical constraints allow a small fraction of query/web page pairs to be labeled by experts. Furthermore, the quality of the labels is of great importance as labels are also used as "ground truth" when evaluating relevancy performance of search engines. Unfortunately, the quality of some of the human expert labels used in search engines may be less than desirable. Further, the quality of labels varies among different judges based on their experience and quality of work. For any given query, a significant number of relevancy labels may be inconsistent or incorrect.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, the relevance of web based search results can be improved through a method of identifying and correcting mislabeled query/URL pairs based upon a click relevance ranking computed from user data comprising user click information. The click relevance ranking is formed by applying a set of relevance ordering rules to user log data aggregated by query and URL and by mapping the results of the relevance ordering rules into a linear ordering. For a given query, the aggregated user log data comprises a relative total number of impression, a relative total number of clicks received and a rank associated with the query/URL pair at the time of the total number of impressions and total number of clicks received. The click relevance ranking is used to identify and correct mislabeled query/URL pairs of other rankings according to a number of disclosed methods. Other embodiments and methods are also disclosed.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Figure 1:
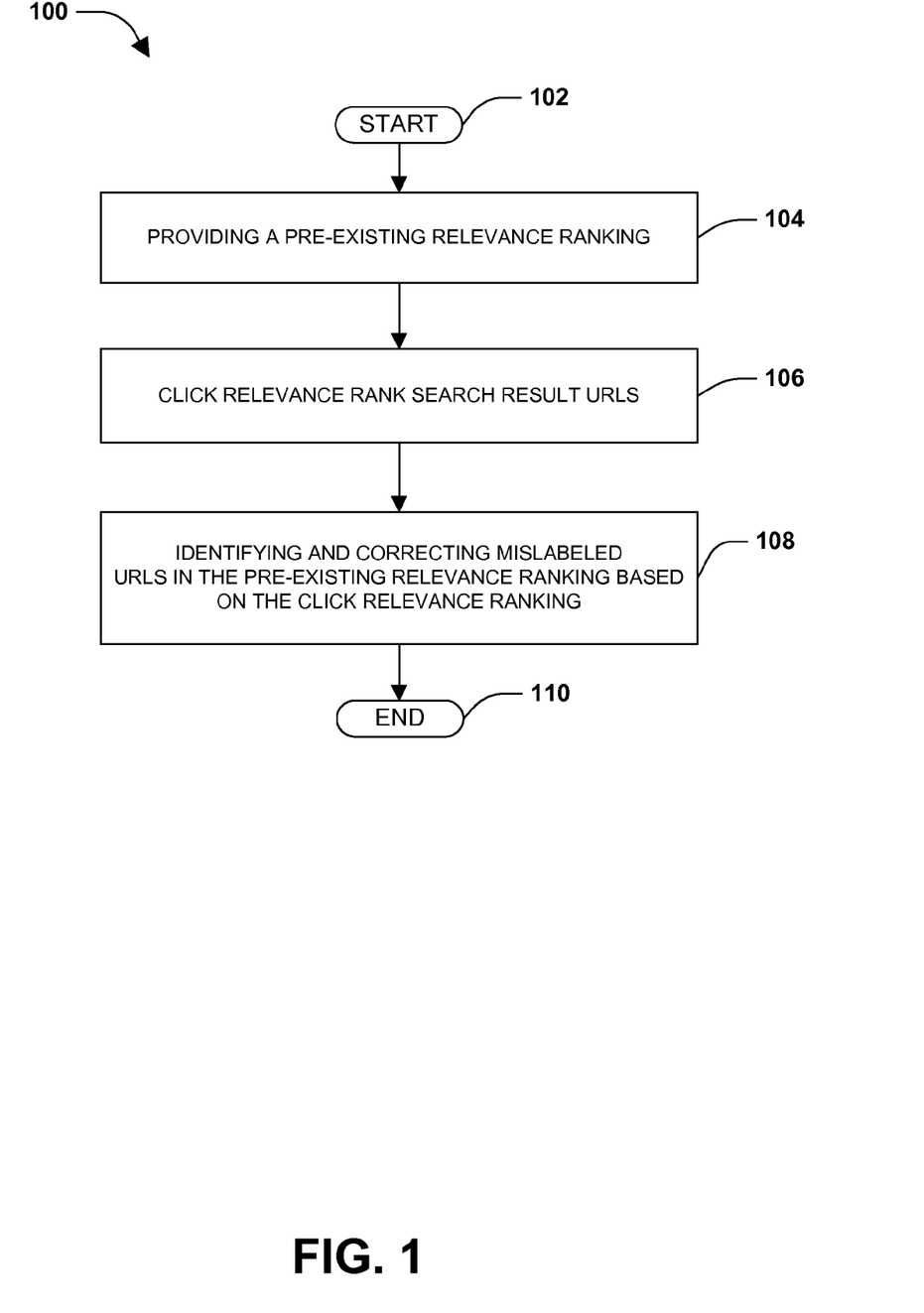
FIG. 1 is a flow chart illustrating an exemplary method of improving the relevance of web based searches.

FIG. 1 illustrates an exemplary method 100 for improving the relevance of web-searches.

At 104 a pre-existing relevance ranking is provided for a word query. The pre-existing relevance ranking can be a based upon any method or algorithm of relevance ranking. In one embodiment, the pre-existing relevance ranking is a pre-existing ranking that is formed from human expert ranking.

At 106 search result URLs for the word query are click relevance ranked. Click relevance ranking is performed on a plurality of search result query/URL pairs and is based on user log information comprising user click data. A set of relevancy ordering rules are applied to the user log information to form a click relevance ranking.

At 108 mislabeled query/URL pairs in the pre-existing relevance ranking are identified and corrected by utilizing the click relevance ranking. The click relevance ranking and the pre-existing relevance ranking are compared using a number of different disclosed methods. The comparison identifies errors in the pre-existing relevance ranking. The pre-existing relevance ranking is then modified based upon the click relevance ranking to correct the identified errors.

Figure 2:
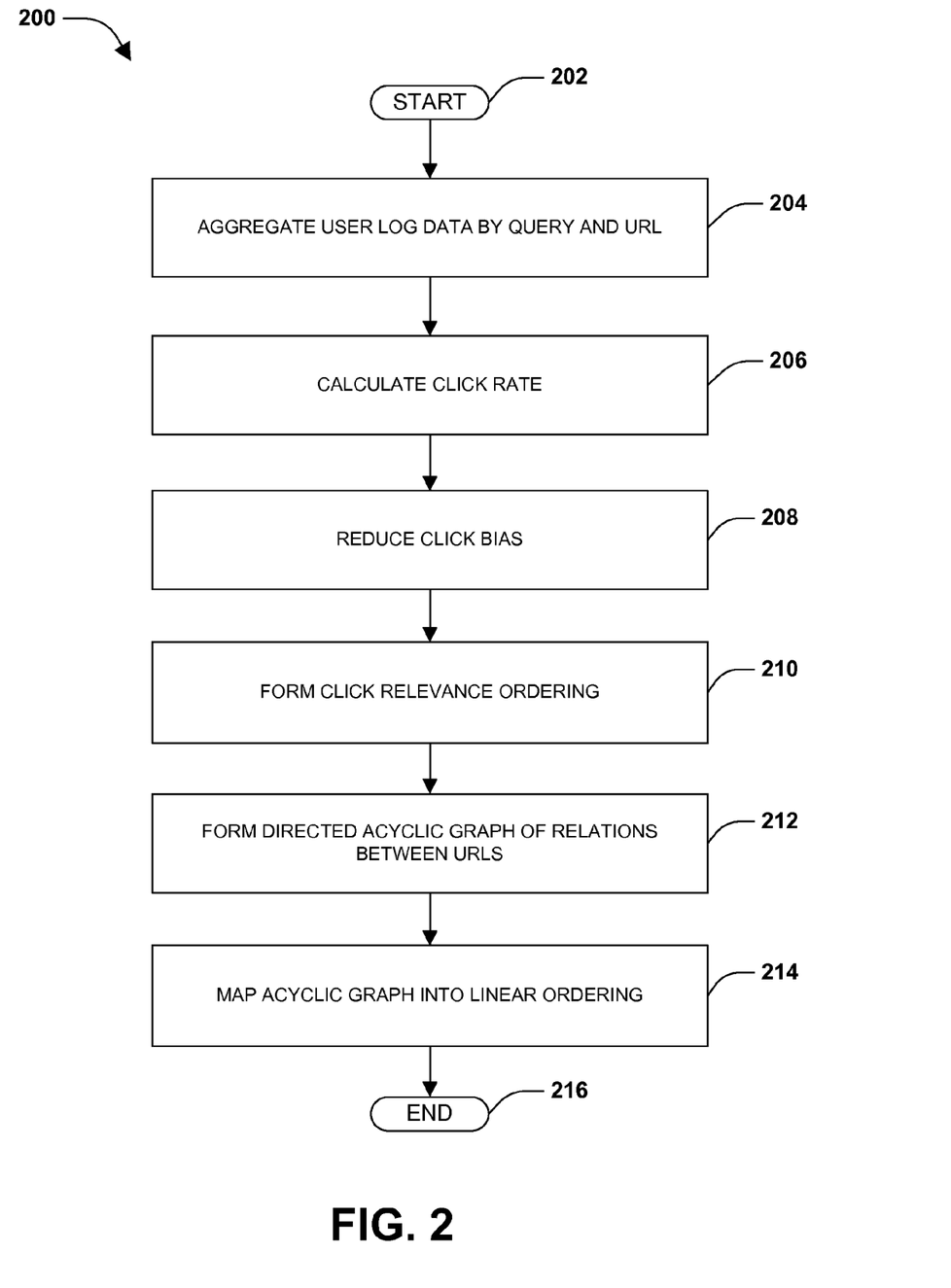
FIG. 2 is a flow chart illustrating an exemplary method of ranking search results.

FIG. 2 shows a flow chart illustrating an exemplary method 200 of click relevance ranking query/URL pairs based on user click data. The method 200 is applied to a plurality of query/URL pairs returned for a word query. In one embodiment, the method relies upon the input of user log data obtained from the search results of one or more users and outputs a click relevancy ranking. In an alternative embodiment, the method relies upon the input of user log data obtained from the search results of a specific individual, thereby providing "personalized" search results for specific individuals. At 204 the user log data is aggregated by query and URL. For respective query/URL pairs the aggregated user log data comprises a total number of impressions (i.e., number of pages shown to a user), a total number of clicks received, and a rank of the query/URL pair at the time of the search associated with the total number of impressions and total number of clicks received.

For respective query/URL pairs a click rate is calculated at 206. The click rate is equal to the sum of the total number of impressions for respective ranks divided by the sum of the total number of clicks received for respective ranks.

The click bias is reduced at 208. Reduction of the click bias is performed by calculating a normalized click rate from the aggregated user log data. The normalized click rate allows an unbiased comparison of the relevance of different query/URL pairs associated with the same query. The unbiased comparison mitigates the influence of ranking on query/URL pair relevance.

At 210 a click relevance ordering is performed. The click relevance ordering is performed by applying a set of click relevance ordering rules to the aggregated user log data and the normalized click rate to form a relevance hierarchy of query/URL pairs. The click relevance ordering rules compare data (e.g., normalized click rate, total impressions, etc.) associated with a first URL to data associated with a second URL to determine if the first URL is more relevant than the second URL. Click relevance ordering rules are applied to the different combinations of the URLs for the word query. For some comparisons, the click relevance ordering rules may be undecided about the relation between the two URLs.

A directed acyclic graph of the relations between query/URL pairs is formed at 212. The results of the click relevance order of query/URL pairs are used to form the acyclic graphic. The acyclic graph provides a graphical representation of the relevance comparisons between query/URL pairs associated with the word query.

At 214 the acyclic graph is mapped into a linear ordering. Linear ordering determines query/URL pair relations that were undecided by the click relevance ordering rules. Mapping the acyclic graph into a linear ordering can be performed by a number of methods such as flooding, for example.

Figure 3:
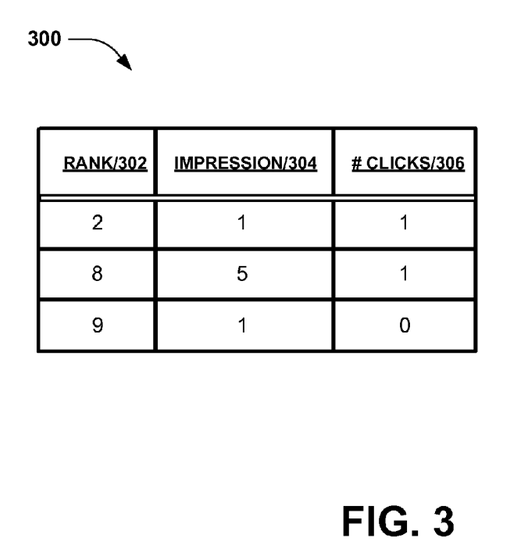
FIG. 3 is a table comprising user log data for a single exemplary query sorted by URL.

A more detailed example of aggregating user log data is set forth in FIG. 3. FIG. 3 shows a table 300 comprising search results for a query/URL pair. The user log data comprises a rank 302, a total number of impressions 304, and a total number of clicks received 306. The rank 302 is a rank assigned to the query/URL pair at the time of the search associated with the number of total impressions 304 and the number of total clicks 306. Since search engines continually update their rankings, respective tables can have a plurality of rows (e.g., since relevance of a query result generally varies over time). The different rows of FIG. 3 is associated with the query/URL pair's search result at a particular time. The total number of impressions 304 is the number of pages shown to a user for the word query. The total number of clicks received 306 is the total number of times that a user clicked on the associated query/URL pair.

Figure 4:
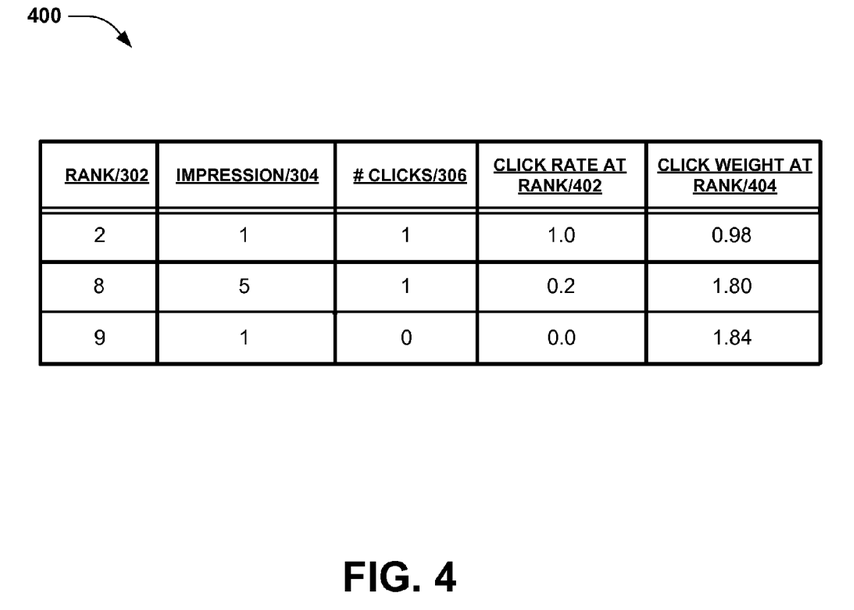
FIG. 4 is an expanded table comprising user log data for a single exemplary query/URL pair and calculated variables for determining the normalized click bias.

In FIG. 4, a more detailed example of a reduction of click bias is set forth in an exemplary table 400. Reduction of click bias is performed by determining a normalized click rate. The normalized click rate provides a means for a query/URL pair with a high ranking to be evenly compared to a query/URL pair with a low ranking. To calculate the normalized click rate the aggregated user log data undergoes a number of intermediate calculations. A click rate at rank 402 is calculated by dividing the number of clicks by the number of impressions. For example, in FIG. 4, the click rate at rank 402 for rank 8 is ⅕. A click weight at rank is a function of the rank and the total number of clicks received, and is calculated, in one example, by the formula $$CW(\text{rank}) = \log \frac{1}{P(\text{click} \mid \text{rank})}$$

It will be appreciated, however, that other algorithms may be utilized for estimating a click bias. Once the click rate at rank 402 and click weight at rank 404 are calculated, the normalized click rate can be calculated by taking the sum of the product of the number of clicks ($C_i$) 306 and click weight at rank ($CW_i$) 402 divided by the total number of impressions ($I_i$) 304, $$NCR = \frac{\sum_{i=1}^{n} C_i \times CW_i}{\sum_{i=1}^{n} I_i}.$$

The normalized click rate is calculated for respective URL/query pairs.

Figure 5:
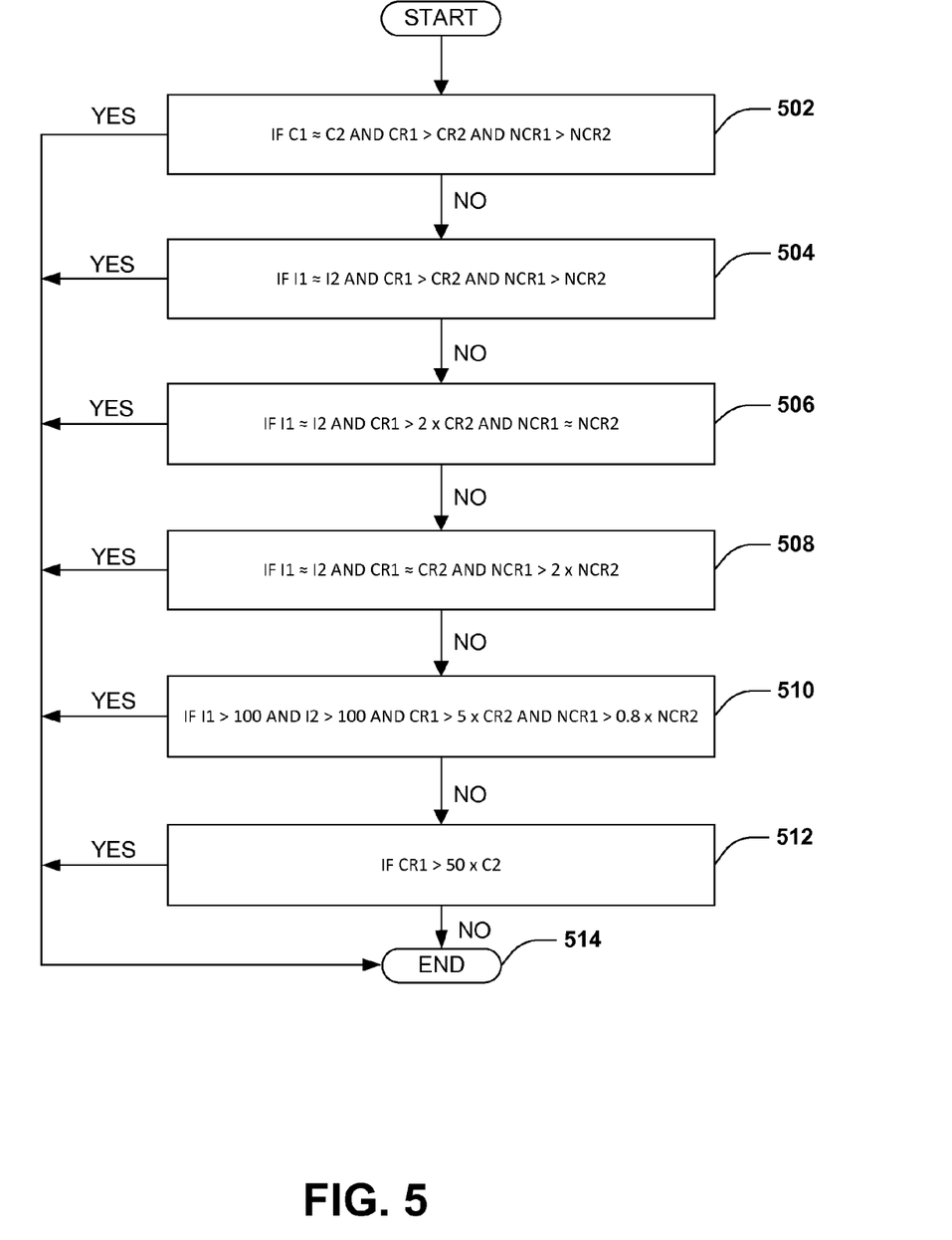
FIG. 5 is a flow chart illustrating an exemplary method of creating a click relevance ordering using click relevance ordering rules.

A more detailed example of click relevance ordering rules utilized in click relevance ranking is set forth in FIG. 5. In one example, the following six click relevance ordering rules illustrated in FIG. 5 are utilized:

if $C_m \approx C_n$ and $CR_m > CR_n$ and $NCR_m > NCR_n$     (1)

if $I_m \approx I_n$ and $CR_m > CR_n$ and $NCR_m > NCR_n$     (2)

if $I_m \approx I_n$ and $CR_m > 2 \times CR_n$ and $NCR_m \approx NCR_n$     (3)

if $I_m \approx I_n$ and $CR_m \approx CR_n$ and $NCR_m > 2 \times NCR_n$     (4)

if $I_m > 100$ and $I_n > 100$ and $CR_m > 5 \times CR_n$ and $NCR_m > 0.8 \times NCR_n$,     (5)

If $CR_m > 50 \times C_n$     (6)

wherein $C_m$ and $C_n$ are the total number of clicks received, $CR_m$ and $CR_n$ are the click rate, $NCR_m$ and $NCR_n$ are the normalized click rate, and $I_m$ and $I_n$ are the total number of impressions for a first URL, $URL_m$, and a second URL, URL$_n$. It will be appreciated, however, that these rules are merely exemplary and that different rules may be utilized to determine click relevance.

At 502 the first relevance order rule (1) is applied. If a first URL and a second URL satisfy rule (1) then the first URL is determined to be more relevant than the second URL and the flow chart goes to 514. If the first and second URL do not satisfy rule (1), then the second rule (2) is applied at 504 to the first and second URLs. If the first URL and the second URL satisfy the second rule (2) then the first URL is more relevant than the second URL. If the first and second URLs do not satisfy the second rule (2) then the third rule is applied at 506 to both URLs. A similar application of rules (3) to (6) applies in 508 to 512. The click relevance ordering rules are applied to the different combinations for query/URL pairs for the word query. It is possible that not all relationships between query/URL pairs will be decided by the click relevance ordering rules. In such a situation, a subsequent linear order (e.g., 210 of FIG. 2) provides a click relevance ranking for undecided relationships.

Figure 6:
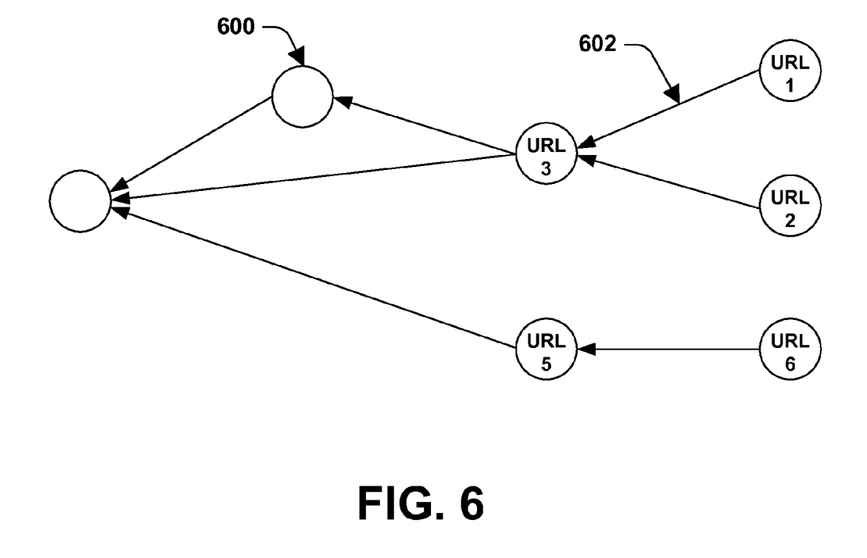
FIG. 6 is an acyclic graph of the relations between exemplary URLs.

FIG. 6 sets forth a more detailed example of a directed acyclic graph illustrating the relationship between query/URL pairs. In FIG. 6, respective URLs of the word query are represented by a vertex 600. The vertices 600 are connected by lines 602 representing comparisons. If URL1 is less preferred than URL3, for example, it is denoted in the acyclic graph by a line 602 pointing from the vertex associated with URL1 to the vertex associated with URL3. For example, in FIG. 6, URL1 and URL2 are less preferred than URL3, and URL6 is less preferred than URL5. If the relationship between two URLs is undecided the vertices associated with those URLs will not be connected by a line.

Figure 7:
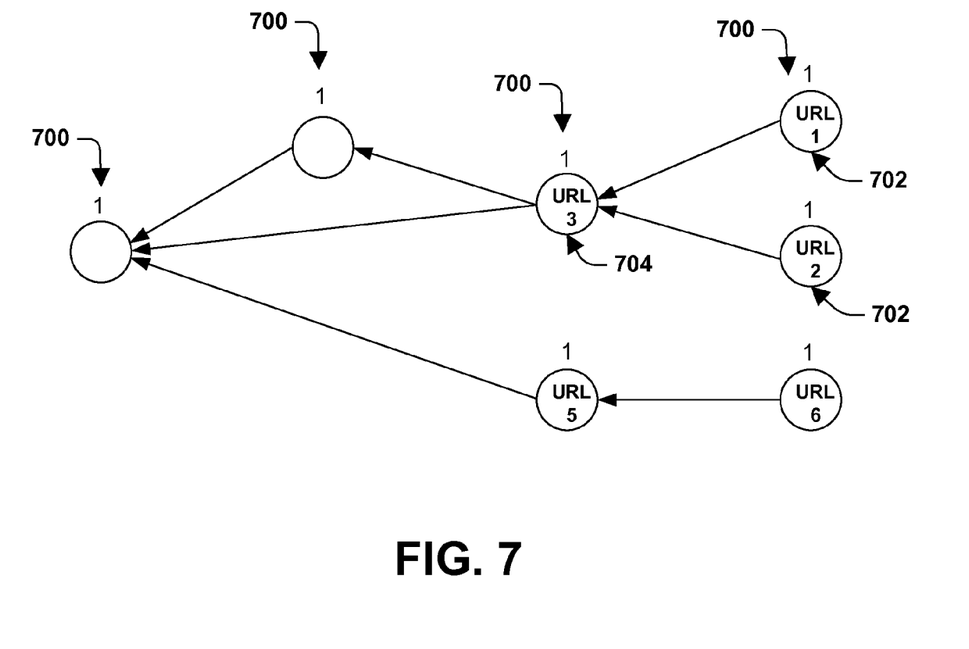
FIGS. 7-10 is a series of acyclic graphs illustrating mapping an exemplary acyclic graph into a linear ordering using a flooding technique.

A more detailed example of mapping the acyclic graph into a linear ordering by a flooding technique is set forth in FIGS. 7-10. Initial weighting assignments 700 of the flooding method are shown in FIG. 7. Initially, a weight of 1 is assigned to respective vertices of the acyclic graph.

Figure 8:
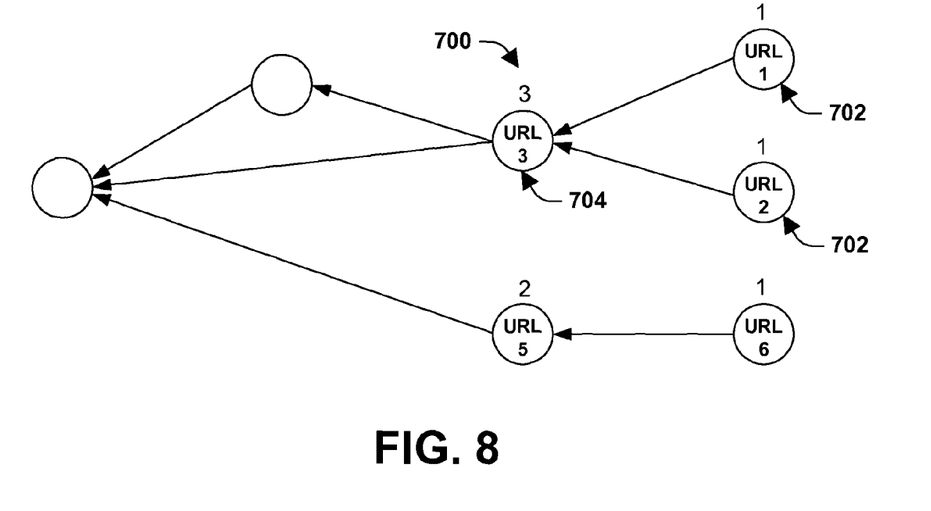
Figure 9:
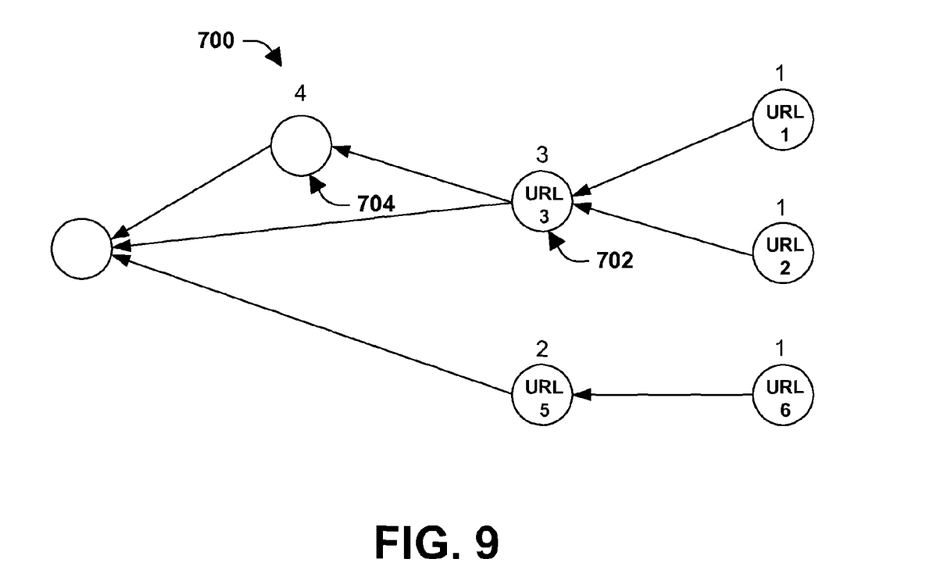
Figure 10:
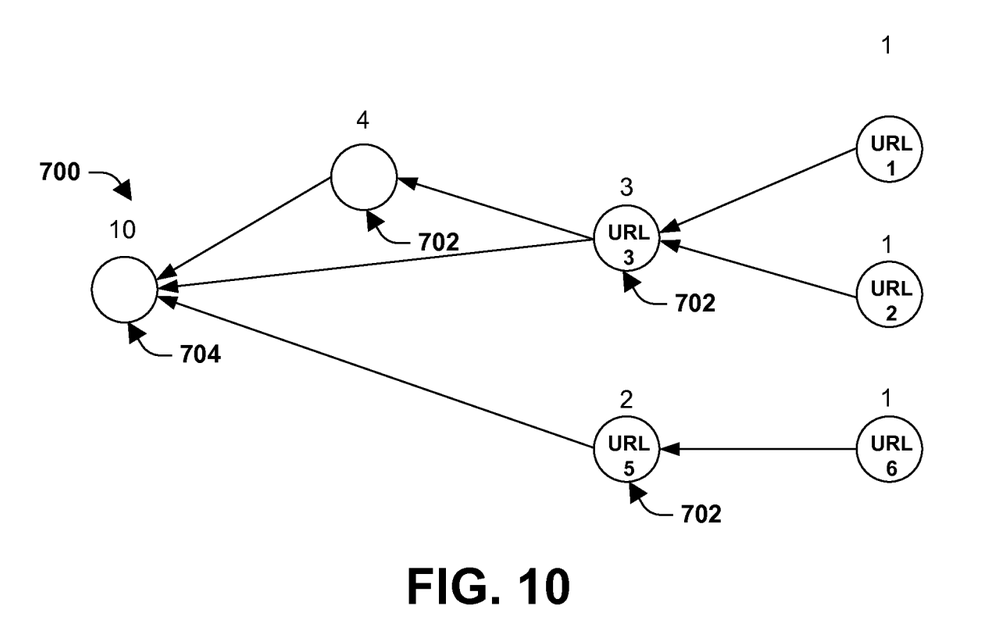

In FIG. 8, the weights 700 are flooded from the rightmost leaf nodes 702 to their parent nodes 704. For example, the weight of the leaf nodes URL1 (e.g., 1) and URL2 (e.g., 1) are added to the weight of the parent node URL3 (e.g., 1) to form a new flooded weight of the parent node URL3 (e.g., 1+1+1=3). FIGS. 9 and 10 show successive steps of the flooding from leaf nodes 702 to parents nodes 704 applied to the acyclic graph of FIG. 6. Once flooding is completed, the result provides an ordering of the query/URL pairs for the word query according to decreasing weight values. This complete ordering is the click relevance ranking.

Once the URL search results are click relevance ranked, the click relevance ranking is used to identify and correct mislabeled URLs in the pre-existing relevance ranking of the word query. Exemplary methods are set forth in FIGS. 11-13 for utilizing the click relevance ranking to identify and correct mislabeled URLs in a human expert labeled pre-existing relevance ranking.

Figure 11:
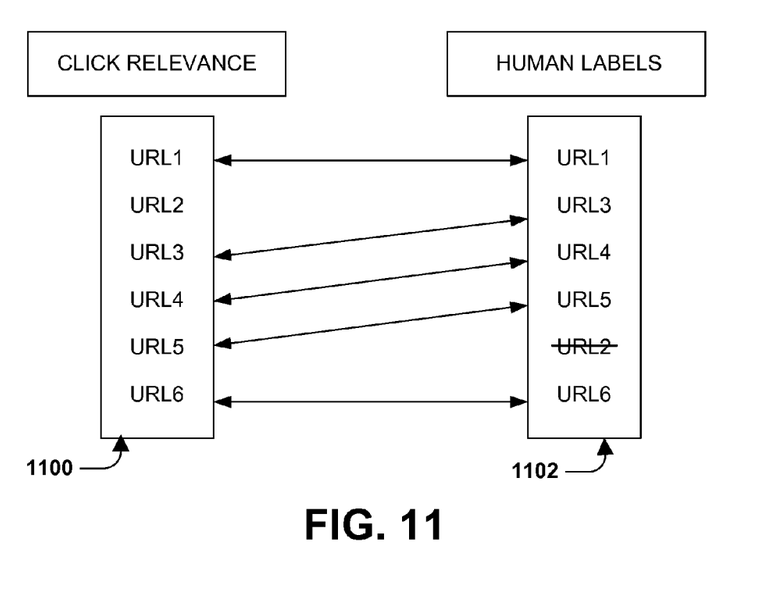
FIG. 11 is a block diagram illustrating an exemplary method of correcting existing labels by discarding URLs not found in a longest common subsequence.

A first embodiment of a method to identify and correct mislabeled query/URL pairs is set forth in FIG. 11. The longest common subsequence (LCS) is found between the click relevance ranking 1100 and the human expert ranking 1102. Labels associated with query/URL pairs not in the LCS are discarded from the human expert ranking 1102. For example, in FIG. 11, the LCS is URL1, URL3, URL4, URL5, and URL6. Therefore, URL2 is discarded from the human expert ranking 1102, resulting in a human expert ranking 1102 of URL1, URL3, URL4, URL5, and URL6.

Figure 12:
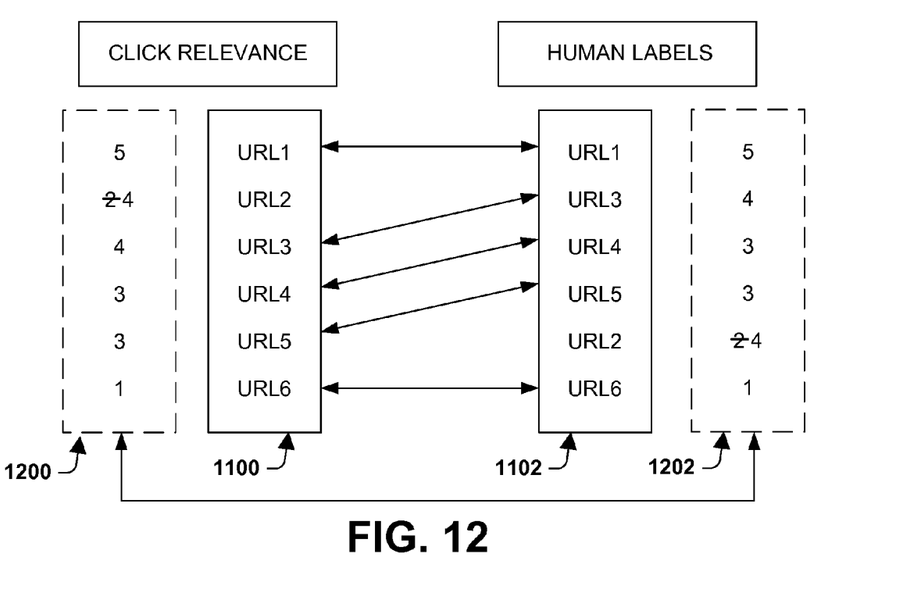
FIG. 12 is a block diagram illustrating an exemplary method of correcting existing labels by discarding URLs not found in a longest common subsequence and interpolation.

An additional embodiment of a method used to identify and correct mislabeled query/URL pairs is set forth in FIG. 12. The LCS between the human expert ranking 1102 and the click relevance ranking 1100 is found. Human expert ranking labels 1202 associated with query/URL pairs that are not in the LCS are replaced with label values interpolated from the click relevance labels 1200. For example, in FIG. 12, URL2 is not in the LCS and therefore the human ranking label 1202 associated with URL2 is set equal to a label value interpolated between the click relevance URL1 label (e.g., 5) and the click relevance URL3 label (e.g., 4).

Figure 13:
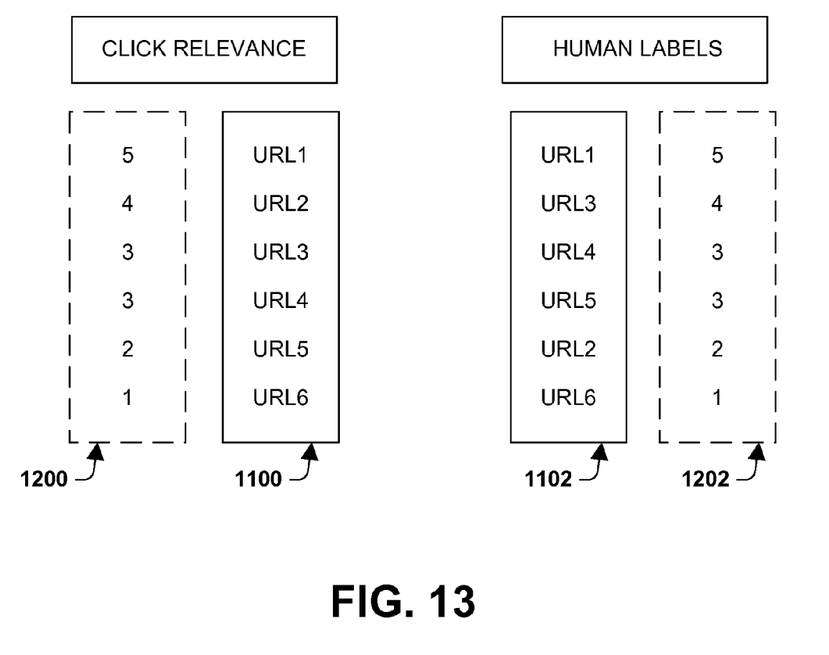
FIG. 13 is a block diagram illustrating an exemplary method of correcting existing labels by sorting URLs by click relevance.

An additional embodiment of a method used to identify and correct mislabeled query/URL pairs is set forth in FIG. 13. In FIG. 13, a distribution of the human expert labels 1202 is computed. Click relevance labels 1200 are then assigned using the distribution of the human expert labels 1202. For example, in FIG. 13 the distribution of the human expert labels 1202 is 1 label 5, 1 label 4, 2 labels 3, 1 label 2, and 1 label 1. The distribution of the human expert labels 1202 is applied to the click relevance labels 1200, thereby labeling URL1 with a 5, URL2 with a 4, URL 3 and URL4 with a 3, URL5 with a 2, and URL6 with a 1.

Figure 14:
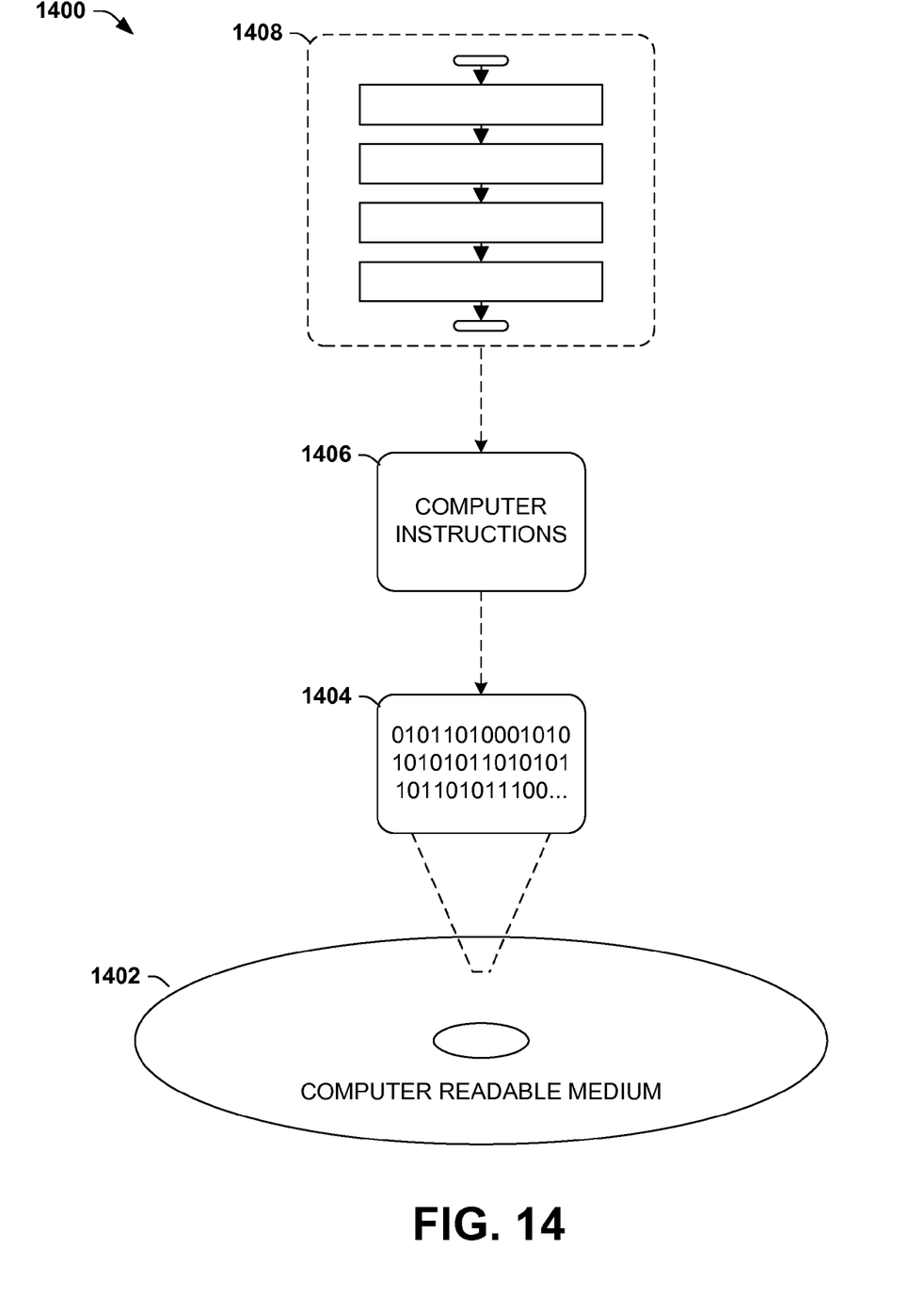
FIG. 14 is an illustration of an exemplary computer-readable medium comprising processor-executable instructions configured to embody one or more of the provisions set forth herein.
Figure 15:
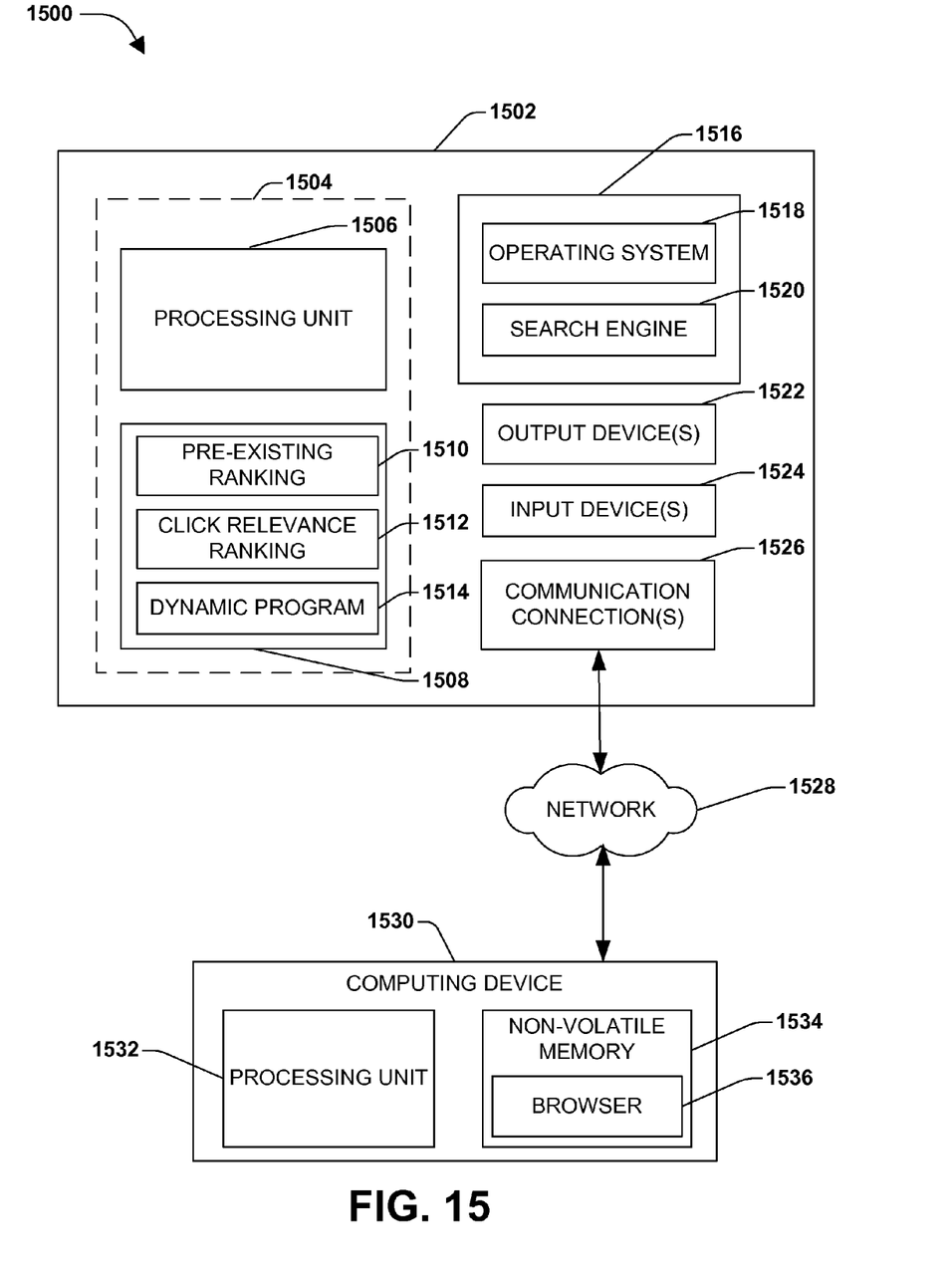
FIG. 15 illustrates an exemplary computing environment wherein one or more of the provisions set forth herein may be implemented.

In a further embodiment of the embodiments shown in FIGS. 14 and 15, the label associated with the most relevant URL is boosted. Boosting is performed when the click rate of the most relevant URL increases to a value that is above a specified threshold, such that the value of the label associated with the most relevant URL is increased by 1. For example, in FIG. 13, if the click rate of URL1 was above 100, the value of the label associated with URL 1 would change from 5 to 6.

Still another embodiment involves a computer-readable medium comprising processor-executable instructions configured to apply one or more of the techniques presented herein. An exemplary computer-readable medium that may be devised in these ways is illustrated in FIG. 14, wherein the implementation 1400 comprises a computer-readable medium 1402 (e.g., a CD-R, DVD-R, or a platter of a hard disk drive), on which is encoded computer-readable data 1404. This computer-readable data 1404 in turn comprises a set of computer instructions 1406 configured to operate according to one or more of the principles set forth herein. In one such embodiment, the processor-executable instructions 1406 may be configured to perform a method of 1408, such as the exemplary method 100 of FIG. 1, for example. In another such embodiment, the processor-executable instructions 1406 may be configured to implement a system configured to improve the relevance rank of web searches for a query. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

FIG. 15 and the following discussion provide a brief, general description of a suitable computing environment to implement embodiments of one or more of the provisions set forth herein. The operating environment of FIG. 15 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 15 illustrates an example of a system 1500 comprising a computing device 1502 (e.g., server) configured to implement one or more embodiments provided herein. In one configuration, computing device 1502 includes at least one processing unit 1506 and memory 1508. Depending on the exact configuration and type of computing device, memory 1508 may be volatile (such as RAM, for example), non-volatile (such as ROM, flash memory, etc., for example) or some combination of the two. In the present disclosure, memory comprises a pre-existing relevance ranking component 1510, a secondary relevance ranking component 1512, and a dynamic program 1514 configured to identify mislabeled query/URL pairs in the pre-existing relevance ranking based on the click relevance ranking. This configuration is illustrated in FIG. 15 by dashed line 1504.

In other embodiments, device 1502 may include additional features and/or functionality. For example, device 1502 may also include additional storage (e.g., removable and/or non-removable) including, but not limited to, magnetic storage, optical storage, and the like. Such additional storage is illustrated in FIG. 15 by storage 1516. In one embodiment, computer readable instructions to implement one or more embodiments provided herein may be in storage 1516. For example, the storage may comprise an operating system 1518 and a search engine 15260 in relation to one or more of the embodiments herein. Storage 1516 may also store other computer readable instructions to implement an operating system, an application program, and the like. Computer readable instructions may be loaded in memory 1508 for execution by processing unit 1506, for example.

The term "computer readable media" as used herein includes computer storage media. Computer storage media includes volatile and nonvolatile, removable and non-removable media implemented in any method or technology for storage of information such as computer readable instructions or other data. Memory 1508 and storage 1516 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1502. Any such computer storage media may be part of device 1502.

Device 1502 may also include communication connection(s) 1520 that allows device 1502 to communicate with other devices. Communication connection(s) 1526 may include, but is not limited to, a modem, a Network Interface Card (NIC), an integrated network interface, a radio frequency transmitter/receiver, an infrared port, a USB connection, or other interfaces for connecting computing device 1502 to other computing devices. Communication connection(s) 1526 may include a wired connection or a wireless connection. Communication connection(s) 1526 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1502 may include input device(s) 1524 such as keyboard, mouse, pen, voice input device, touch input device, infrared cameras, video input devices, and/or any other input device. Output device(s) 1522 such as one or more displays, speakers, printers, and/or any other output device may also be included in device 1502. Input device(s) 1524 and output device(s) 1516 may be connected to device 1502 via a wired connection, wireless connection, or any combination thereof. In one embodiment, an input device or an output device from another computing device may be used as input device(s) 1524 or output device(s) 1522 for computing device 1502.

Components of computing device 1502 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1502 may be interconnected by a network. For example, memory 1508 may be comprised of multiple physical memory units located in different physical locations interconnected by a network.

Those skilled in the art will realize that storage devices utilized to store computer readable instructions may be distributed across a network. For example, a computing device 1530 accessible via network 1528 may store computer readable instructions to implement one or more embodiments provided herein. In one configuration, computing device 1530 includes at least one processing unit 1532 and memory 1534. Depending on the exact configuration and type of computing device, memory 1506 may be volatile (such as RAM, for example), non-volatile (such as ROM, flash memory, etc., for example) or some combination of the two. In one embodiment, computer readable instructions to implement one or more embodiments provided herein may be in memory 1534. For example, the memory may comprise a browser 1536 in relation to one or more of the embodiments herein.

Computing device 1502 may access computing device 1530 and download a part or all of the computer readable instructions for execution. Alternatively, computing device 1502 may download pieces of the computer readable instructions, as needed, or some instructions may be executed at computing device 1502 and some at computing device 1530.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, comprising:
   computing a click relevance ranking of a first pair and a second pair based upon user log data, the first pair comprising a query and a first URL, the second pair comprising the query and a second URL, the computing comprising:
   reducing click bias associated with at least one of the first pair or the second pair by determining a normalized click rate from the user log data;
   creating, after the reducing, a directed acyclic graph of a relevance relationship between the first pair and the second pair, the directed acyclic graph comprising a representation of at least one of the first URL or the second URL, the representation in the directed acyclic graph directly connected in the directed acyclic graph to a second representation of one or more URLs in the directed acyclic graph; and
   mapping the directed acyclic graph into a linear ordering to ascertain the click relevance ranking.

2. The method of claim 1, comprising identifying one or more mislabeled pairs in a pre-existing relevance ranking.

3. The method of claim 2, comprising correcting at least some of the one or more mislabeled pairs.

4. The method of claim 3, the correcting based upon the click relevance ranking.

5. The method of claim 1, comprising mapping the directed acyclic graph into the linear ordering using a flooding technique.

6. The method of claim 1, the user log data associated with a specific individual.

7. The method of claim 2, comprising at least one of:
   determining a longest common subsequence (LCS) of one or more pairs that is decreasing in both the pre-existing relevance ranking and the click relevance ranking; or
   removing labels from one or more pairs which are not in the LCS.

8. The method of claim 3, comprising modifying the pre-existing relevance ranking based upon at least some of the corrected pairs.

9. The method of claim 2, comprising:
   computing a distribution of labels in the pre-existing relevance ranking; and
   relabeling one or more labels associated with at least one of the first pair or the second pair based upon the distribution of labels in the pre-existing relevance ranking.

10. A system, comprising:
    one or more processing units; and
    memory comprising instructions that when executed by at least some of the one or more processing units perform a method comprising:
    computing a click relevance ranking of a first pair and a second pair based upon user log data, the first pair comprising a query and a first URL, the second pair comprising the query and a second URL, the computing comprising:
    creating a directed acyclic graph of a relevance relationship between the first pair and the second pair, the directed acyclic graph comprising a representation of at least one of the first URL or the second URL, the representation in the directed acyclic graph directly connected in the directed acyclic graph to a second representation of one or more URLs in the directed acyclic graph; and
    mapping the directed acyclic graph into a linear ordering to ascertain the click relevance ranking.

11. The system of claim 10, the method comprising identifying one or more mislabeled pairs in a pre-existing relevance ranking.

12. The system of claim 11, the method comprising correcting at least some of the one or more mislabeled pairs.

13. The system of claim 12, the correcting based upon the click relevance ranking.

14. The system of claim 10, the method comprising mapping the directed acyclic graph into the linear ordering using a flooding technique.

15. The system of claim 11, the method comprising at least one of:
   determining a longest common subsequence (LCS) of one or more pairs that is decreasing in both the pre-existing relevance ranking and the click relevance ranking; or
   removing labels from one or more pairs which are not in the LCS.

16. The system of claim 12, the method comprising modifying the pre-existing relevance ranking based upon at least some of the corrected pairs.

17. The system of claim 10, the user log data associated with a specific individual.

18. A tangible computer-readable storage device comprising instructions that when executed perform a method comprising:
   computing a click relevance ranking of a first pair and a second pair based upon user log data, the first pair comprising a query and a first URL, the second pair comprising the query and a second URL, the computing comprising:
      reducing click bias associated with at least one of the first pair or the second pair by determining a normalized click rate;
      creating, after the reducing, a directed acyclic graph of a relevance relationship between the first pair and the second pair; and
      mapping the directed acyclic graph into a linear ordering to ascertain the click relevance ranking;
   identifying one or more mislabeled pairs in a pre-existing relevance ranking; and one or more of:
      at least one of:
         determining a longest common subsequence (LCS) of one or more pairs that is decreasing in both the pre-existing relevance ranking and the click relevance ranking; or
         removing labels from one or more pairs which are not in the LCS;
      or
      relabeling one or more labels associated with at least one of the first pair or the second pair based upon a computed distribution of labels in the pre-existing relevance ranking.

19. The tangible computer-readable storage device of claim 18, the method comprising mapping the directed acyclic graph into the linear ordering using a flooding technique.

20. The tangible computer-readable storage device of claim 18, the method comprising correcting at least some of the one or more mislabeled pairs.

* * * * *